United States Patent [19]

Kohler et al.

[11] Patent Number: 4,625,385
[45] Date of Patent: Dec. 2, 1986

[54] METHOD FOR MOUNTING A WHEEL FLANGE

[75] Inventors: Terry K. Kohler, St. Clair Shores, Mich.; William L. Grube, Lake Bluff, Ill.; Norbert G. Giczewski, Jr., Livonia, Mich.

[73] Assignee: Metform Corporation, Savanna, Ill.

[21] Appl. No.: 755,671

[22] Filed: Jul. 16, 1985

[51] Int. Cl.⁴ .......................... B23Q 3/00; B25B 27/00
[52] U.S. Cl. ........................................ 29/467; 29/240; 29/270; 29/464
[58] Field of Search .............. 29/467, 464, 240, 240.5, 29/270; 411/427

[56] References Cited
U.S. PATENT DOCUMENTS 3,817,146  6/1974  Scott ..................................... 29/464
4,214,792  7/1980  Hardwicke et al. ................. 411/427
4,254,542  3/1981  Craig ..................................... 29/464
4,333,688  6/1982  Lemmon et al. ..................... 411/427

Primary Examiner—Howard N. Goldberg
Assistant Examiner—Irene Graves Golabi
Attorney, Agent, or Firm—Krass & Young

[57] ABSTRACT

A tool to facilitate the mounting and centering of dual wheels on an axle hub and the method for using the tool. The tool is a pin structure having coaxial female threads at one end, allowing the pin to be attached to the threads of the lug bolt, serving as an outward extension of the lug bolt. One or more such tools are attached to lug bolts on the axle hub, providing a pin or pins upon which the two wheels may be placed sequentially. In this configuration, the two wheels counteract and hold each other in properly centered orientation while they are fastened to the axle hub with lug nuts. After the dual wheels are fastened in place, the pin or pins are removed and the lug bolts to which they were attached are also used to fasten the dual wheels to the axle hub.

3 Claims, 10 Drawing Figures

METHOD FOR MOUNTING A WHEEL FLANGE

DESCRIPTION

1. Field of the Invention

The present invention relates to the mounting and dismounting of wheels and, more particularly, to a mounting/centering pin and the method for its use, especially with dual wheels.

2. Description of the Prior Art

Many of the medium- and heavy-duty trucks in the United States and throughout the world use dual wheels on their tractors and trailers. It is estimated that in the United States alone there are presently many millions of tubeless disk wheels in highway use, most of them in dual wheel configurations.

Dual wheel configurations mount two wheel-tire combinations at each end of an axle, increasing the tractive force which can be applied through the axle and doubling the load-bearing tire surface area. A dual wheel configuration usually uses two identical wheels, each having a mounting flange plate perpendicular to its axis of rotation. The mounting flange plate has a circular pattern of uniformly spaced holes (most commonly ten holes). Lug nuts are applied to the ends of the lug bolts which extend through the mounting holes, holding the wheel in place on the axle hub. The mounting flange plate is displaced outside the volume defined by the planes within which the mounted tire rotates. After mounting them on a dual wheel axle, the two wheels are oriented so that their mounting flange plates abut and their mounting holes coincide.

In one of the most common dual wheel mounting system employed in the United States, the wheels are mounted and fastened to the axle in two steps. First, the inner dual wheel is placed on the axle hub with its flange extending outward from the vehicle and ten inner nuts are torqued onto the lug bolts. These nuts have partial spherical surfaces at their inner end for both centering and clamping the flange of the inner wheel to the axle hub. The inner cap nuts have, on their outer end, a threaded axial surface of greater diameter than the original axle lug bolts. These ten new threaded surfaces serve as a second set of lug bolts for mounting the outer dual wheel.

Next, the outer dual wheel is placed on this set of ten lug bolts and a set of ten outer cap nuts having partial spherical centering and clamping surfaces are applied. In this system, the mounting flange of the inner dual wheel is clamped to the axle hub, while the mounting flange of the outer dual wheel is clamped against the flange of the inner wheel.

Because the mounting flange of each dual wheel is outside the volume defined by the planes of the tires, when the wheel is hung on the lug bolts, the wheel may sometimes have a tendency to wobble on the lug bolts thereby creating some difficulty for the individual attempting to mount the wheel. In addition, centering of the wheel about the axle's axis of rotation is accomplished entirely by the partial spherical surface on the lug nuts. The lug nuts also may tend to "freeze" on the parts after a period of time and become difficult to remove.

While this known method has provided satisfactory results, it would be desirable to provide a technique for mounting wheels that requires fewer individual parts and less maintenance time.

SUMMARY OF THE INVENTION

The present invention provides a tool and method for mounting a wheel on a vehicle hub. While the broad aspects of this invention can be used for single wheel assemblies, it finds particular utility for mounting two wheels on a dual wheel axle hub. The tool serves to hang the wheels in proper position while driving on the lug nuts, centering each mounting hole about its corresponding lug bolt. Also, the convenience of mounting dual wheels is enhanced, because the imbalances which would cause a single dual wheel to "tip" off the axle hub counteract, allowing the two mounting flanges to stay substantially parallel.

The tool generally consists of a pin having threads in an end, allowing it to be screwed onto a lug bolt. The cross section of this pin can be a rounded hexagon, the rounded surfaces having a diameter which is just slightly smaller than the diameter of the wheel mounting holes and the opposing flats serving as wrenching surfaces for attaching and detaching the pin to and from the axle lug bolts.

The wheel mounting system utilizing these pins temporarily attaches two such pins to wheel hub lug bolts at approximately diametrically opposite points in the lug bolt pattern. While the wheel or pair of dual wheels is hanging in position from these two mounting pins, the lug bolts that are still exposed have lug nuts applied and torqued according to specifications. The lug nuts are preferably a type which serve to center the wheel holes of the wheel flanges about their respective bolts. A lug nut having a cylindrical projection toward the wheel flange, whose outer diameter is just slightly less than the inner diameter of the wheel hole would serve this purpose. The two mounting pins are then removed from their positions and lug nuts applied to these last two lug bolts.

In many dual wheel configurations, the lug bolts on the left side of the vehicle have left-handed threads while those on the right side of the vehicle have right-handed threads. For these situations, each mounting pin could have right handed threads in one end and left-handed threads in the other end.

DETAILED DESCRIPTION OF THE PREFERRED EMBODIMENT

Figure 1:
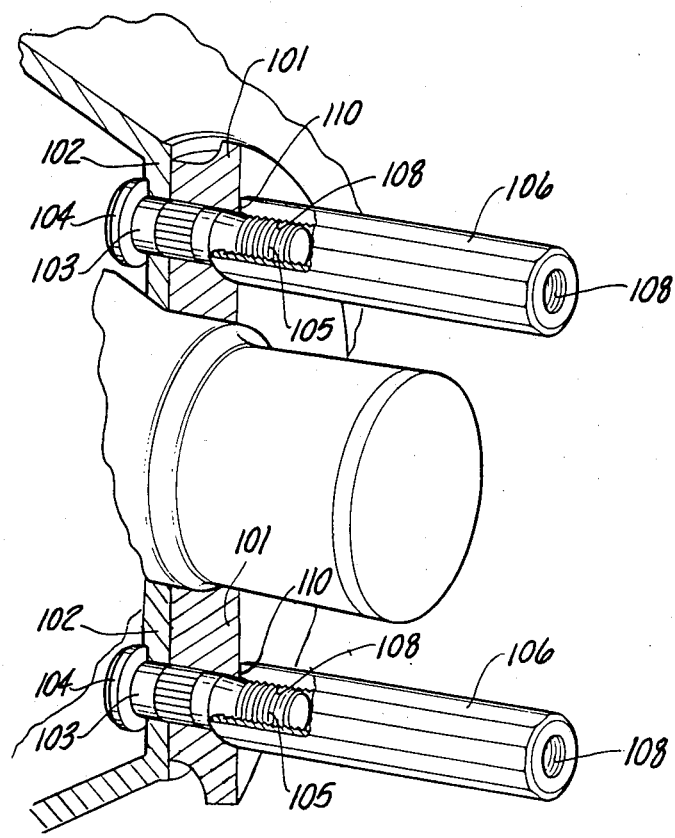
FIG. 1 is a perspective view showing a typical hub and drum assembly for a dual wheel configuration illustrating the mounting/centering pin in place on lug bolts.

Referring now to the drawings and, more particularly, to FIG. 1, a general understanding of a preferred embodiment of this invention may be obtained.

FIG. 1 shows two mounting/centering pins 106 screwed onto diametrically opposite lug bolts 103 on axle hub 101. This embodiment of the mounting/centering pin 106 may have threads 108 placed at one end, the threads being suitable for fastening on a threaded portion 105 of lug bolt stud 103. The outer perimeter of the cross sectional area of pin 106 when taken perpendicular to the axis of pin 106 is fixed. In the preferred embodiment illustrated in FIG. 1, this outer perimeter consists of three pairs of parallel sides arranged as in a hexagon, each consecutive pair of sides being joined by a circular arc, the diameter of the cicle being slightly smaller than the diameter of the mounting holes of the wheel to be placed on the axle hub 101. The embodiment of mounting/centering pin 106 shown in FIG. 1, has threaded portions 108 at both ends, these threaded portions 108 may be of opposite handedness or different pitches, thereby making the mounting/centering pin 106 useful in more applications. The opposing parallel faces of the outer cross sectional perimeter are useful in wrenching the pin on and off the lug bolt 103.

The mounting/centering pin 106 may be made from a variety of materials, and the outer perimeter of its cross sectional area may be chosen suitably for the application.

The axle hub 101 and the drum 102 are shown abutted, with a lug bolt stud 103, passing through both the wheel hub 101 and wheel drum 102. The lug bolt stud 103 has a head 104 at one end and a threaded portion 105 at the other, the stud 103 being placed through the hub 101 and drum 102 so that the threaded end 105 of the lug bolt stud 103 is directed outward from the vehicle.

Figure 2:
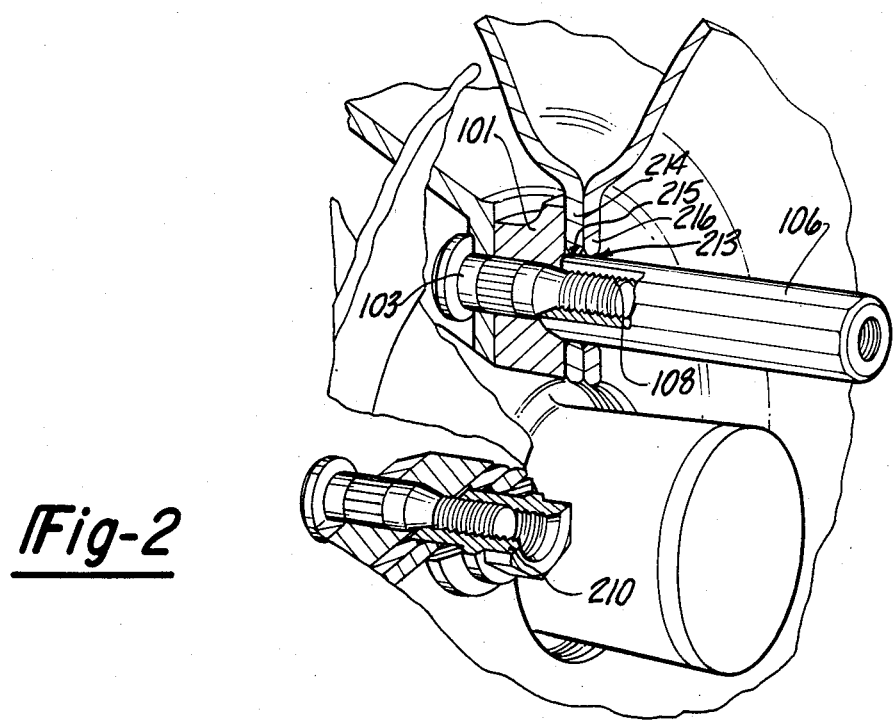
FIG. 2 is a perspective view, with parts in axial cross section, of one of the mounting/centering pins and of a wheel nut clamping two wheels together on the hub.

Referring now to FIG. 2, which shows two wheels in the process of being mounted, it can be appreciated that the threads 108 in one end of the mounting/centering pin 106 can be made long enough to accommodate any length of lug bolt stud 103. By placing two of the mounting/centering pins 106 on horizontal diametrically opposed lug bolts 103 (see FIG. 1), the wheels 214 and 216 can be consecutively placed in position for clamping to the wheel hub 101 by means of lug nuts such as wheel nut 210.

Figure 3:
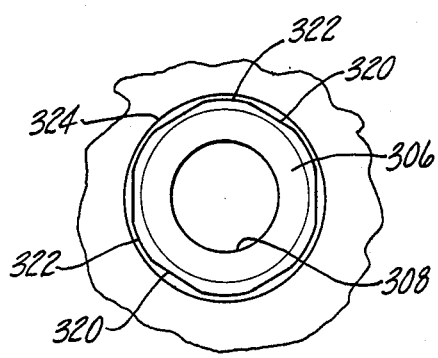
FIG. 3 shows an end-on view of the embodiment of the mounting/centering pin of FIG. 2 positioned on a lug bolt.

Referring to FIG. 3, the end-on view of an installed mounting/centering pin of the type shown in FIG. 1 may be appreciated. This view shows the pin body 106 and the internally threaded surface 108. Also illustrated are the hexagonal flats 320, the edges normally defined by the intersection of two such flats 320 having been removed to permit the pin to assume the shape defined by the circular arcs 322. This entire pin fits within the circular wheel hole 324. The remaining portions of the hexagonal flats 320 may be used in wrenching the pin 106 on and off the lug bolts.

Figure 4:
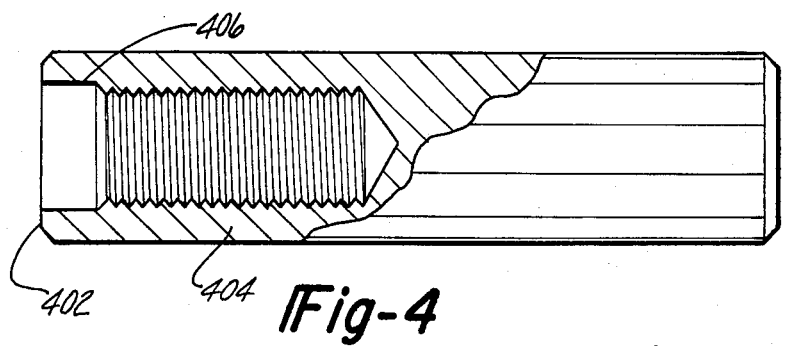
FIG. 4 shows an axial cross sectional view of a second embodiment of the mounting/centering pin.

Shown in FIG. 4 of the drawings is another embodiment of the pin, wherein the inner threaded portion of the pin does not extend to the pin end 402, but rather terminates within the inner surface of the pin body 404. This allows an unthreaded inner surface 406 to be defined. Surface 406 can accommodate lug bolts whose unthreaded portion may extend outwardly from the plane of the wheel hub (shown as 101 in FIG. 1).

Figure 5:
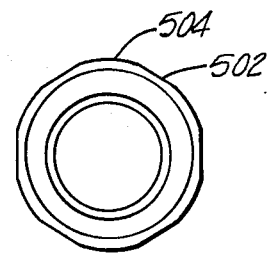
FIG. 5 shows an end view of the mounting/centering pin shown in FIG. 4 as viewed from the left side.

FIG. 5, illustrates the external shape of a second embodiment of the mounting/centering pin shown as pin 106 in FIG. 1. This cross section shows a hexagonal profile 502, modified by rounding 504 of the vertices of the hexagon, the diameter of the circle of rounding being just slightly less than the diameter of the mounting holes, such as holes 215 and 213 found in the wheels 214 and 216, respectively, shown in FIG. 2.

Figure 6:
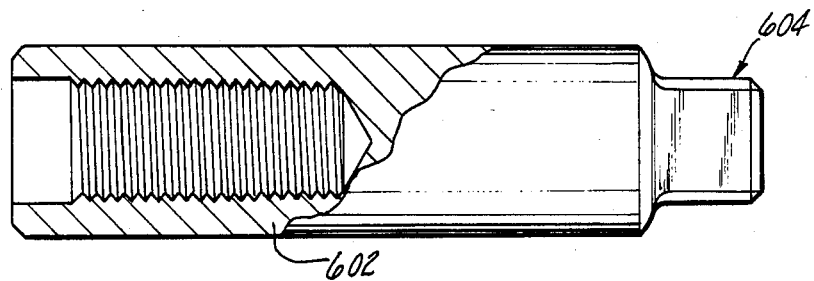
FIG. 6 shows an axial cross sectional view of a third embodiment of a mounting/centering pin.
Figure 8:
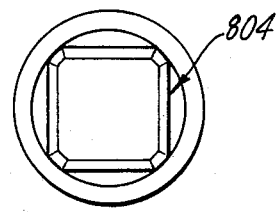
FIG. 8 shows an end view of the mounting/centering pin of FIG. 6 as viewed from the right side.
Figure 7:
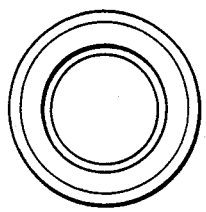
FIG. 7 shows an end view of the mounting/centering pin shown in FIG. 6 as viewed from the left side.

FIG. 6 illustrates a third embodiment of the mounting/centering pin 602. As illustrated in FIG. 7 this embodiment of the mounting/centering pin 602 (in FIG. 6) has a circular cross section. Attaching and detaching this pin is accomplished by the square drive mechanism 604 and 804, as illustrated in FIGS. 6 and 8, respectively.

Figure 9:
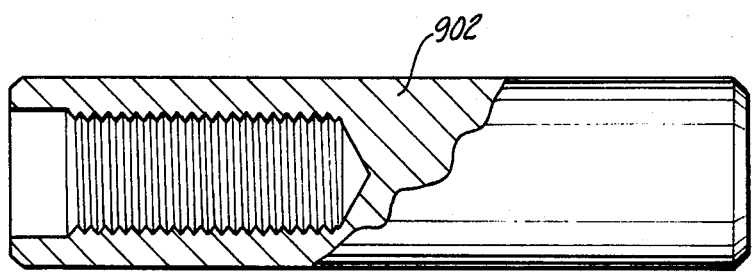
FIG. 9 shows an axial cross sectional view of a fourth embodiment of a mounting/centering pin.
Figure 10:
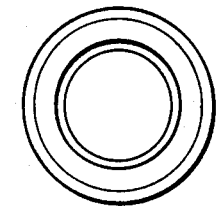
FIG. 10 shows an end view of the mounting/centering pin shown in FIG. 9, as viewed from the left side.

FIG. 9 shows a fourth embodiment of the mounting/centering pin 902, this pin also having a circular cross section as illustrated in FIG. 7.

Other modifications of the present invention will become apparent to one skilled in the art after a study of the drawings, specification, and the following claims, which define the spirit and scope of the embodiments of the invention in which an exclusive property or privilege is claimed.

We claim:

1. A method for mounting one or more wheel flanges to the hub of an axle, the hub having attached thereto a plurality of attachment means arranged in a fixed pattern, the wheel flanges each having a plurality of mounting holes therethrough arranged in said fixed pattern, said mounting holes adapted to receive said attachment means, comprising:
   (a) cooperatively engaging at least one of said plurality of attachment means each with a pin having an axial dimension greater than the combined thicknesses of said wheel flanges, a transverse cross-section whose smallest circumscribed circle will fit within the corresponding mounting hole, and having a strength sufficient to hold the wheels, and the tires mounted thereon, when they support the wheels with the pins extending through the corresponding mounting holes;
   (b) for each said wheel flange, placing the mounting hole corresponding to each said cooperatively engaged attachment means about said attachment means by passing said pin through said mounting hole to support each wheel flange in proper alignment with each of the plurality of attachment means;
   (c) cooperatively engaging some of the attachment means which remain unengaged with fastening means to clamp said wheel flanges toward said hub;
   (d) detaching all said pins cooperatively engaged in step (a), above; and
   (e) cooperatively engaging some of the attachment means which remain unengaged with fastening means to further clamp said wheel flanges toward said hub.

2. A method for mounting one or more wheel flanges to the hub of an axle, the hub having attached thereto a plurality of lug bolts arranged in a fixed pattern, the wheel flanges each having a plurality of mounting holes therethrough arranged in said fixed pattern, comprising:
   (a) threadably engaging at least one of said plurality of lug bolts each with a pin having an axial dimension greater than the combined thicknesses of said wheel flanges, a transverse cross-section whose smallest circumscribed circle will fit within the corresponding mounting hole, and having a strength sufficient to hold the wheels, and the tires mounted thereon, when they support the wheels with the pins extending through the corresponding mounting holes;
(b) for each said wheel flange, placing the mounting hole corresponding to said lug bolt about said lug bolt by passing said pin through said mounting hole to support each wheel flange in proper alignment with each of the plurality of lug bolts;
(c) threadably engaging some of the lug bolts which remain unengaged with lug nuts to clamp said wheel flanges toward said hub;
(d) detaching all said pins threadably engaged in step (a), above; and
(e) threadably engaging some of the lug bolts which remain unengaged with lug nuts to further clamp said wheel flanges toward said hub.

3. A method for mounting one or more wheel flanges to the hub of an axle, the hub having attached thereto a plurality of lug bolts arranged in a fixed pattern, the wheel flanges each having a plurality of mounting holes therethrough arranged in said fixed pattern, comprising:
(a) threadably engaging two or more of said plurality of said lug bolts each with an elongated axial pin capable of passing through the respective mounting hole in said wheel flanges;
(b) for each said wheel flange, placing the mounting hole corresponding to said lug bolt about said lug bolt by passing said pin through said mounting hole to support each wheel flange in proper alignment with each of the plurality of lug bolts;
(c) threadably engaging some of the lug bolts which remain unengaged with lug nuts to clamp said wheel flanges toward said hub;
(d) detaching all said pin threadably engaged in step (a), above; and
(e) threadably engaging some of the lug bolts which remain unengaged with lug nuts to further clamp said wheel flanges toward said hub.

* * * * *